US011910156B1

(12) United States Patent
Baratelli et al.

(10) Patent No.: US 11,910,156 B1
(45) Date of Patent: Feb. 20, 2024

(54) AUDIO MODULES WITH FINS TO REDUCE ACOUSTIC NOISE DUE TO AIRFLOW

(71) Applicant: Apple Inc., Cupertino, CA (US)

(72) Inventors: Marco Baratelli, San Francisco, CA (US); Claudio Notarangelo, San Francisco, CA (US); Matthew A. Donarski, San Francisco, CA (US); Mo C. Chan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/895,984

(22) Filed: Aug. 25, 2022

(51) Int. Cl.
*H04R 1/28* (2006.01)

(52) U.S. Cl.
CPC .................................. *H04R 1/2888* (2013.01)

(58) Field of Classification Search
CPC ...... H04R 1/22; H04R 1/2842; H04R 1/2857; H04R 1/345; H04R 1/2873; H04R 1/2869; H04R 1/2884; H04R 1/2888
See application file for complete search history.

(56) References Cited

U.S. PATENT DOCUMENTS 8,275,164 B1 * 9/2012 Nguyen ............... H04R 1/2857 381/337
9,736,595 B2 8/2017 Elyada
10,932,039 B2 2/2021 Zheng et al.
2015/0104029 A1 4/2015 Cheng et al.

* cited by examiner

*Primary Examiner* — Kile O Blair
(74) *Attorney, Agent, or Firm* — BAKERHOSTETLER

(57) ABSTRACT

Implementations of the subject technology provide an acoustic module with fins integrated within the acoustic module to reduce acoustic noise. Airflow caused by pressure changes due to an oscillating diaphragm can be diverted by the fins within the acoustic module. The diverted airflow provide a more uniform airflow distribution within the acoustic module, which leads to a lower peak velocity and less unwanted noise. Fins may include a curved or crescent shape and may be spaced in a certain manner to divert the airflow.

20 Claims, 10 Drawing Sheets

AUDIO MODULES WITH FINS TO REDUCE ACOUSTIC NOISE DUE TO AIRFLOW

TECHNICAL FIELD

The present description relates generally to acoustic devices including, for example, audio modules with fins.

BACKGROUND

Audio modules, such as speakers, generate acoustical energy in the form of audible sound. Audio modules generally include a diaphragm driven by a motor to produce the audible sound. In some cases, however, the resultant airflow from diaphragm oscillation causes unwanted noise due to the airflow achieving certain velocities. Moreover, smaller audio modules commonly found in consumer electronic devices often include turns or bends in the audio module housing. These turns can separate the airflow within the housing and cause uneven airflow distribution within the housing, which also contributes to the unwanted noise.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices, such as mobile wireless communication devices (e.g., smartphones, tablet computing devices) include audio modules designed to output acoustical energy in the form of audio content, such as music, audio tracks corresponding to video content, voices of remote users of electronic devices participating in phone calls or audio and/or video conferences, podcasts, or any other audio content. Audio modules described herein may include a membrane, or diaphragm, driven by a voice coil to produce the audio content. The movement of the membrane causes pressure fluctuations within the audio module, causing airflow throughout the audio module. In some instances, however, the resultant airflow causes unwanted acoustical noise, i.e., audio content separate from the desired audio content. This may be due in part, for example, to a relatively high airflow velocity and a generally uneven airflow distribution through the audio module.

In accordance with aspects of the subject technology, an audio module, or audio output device, is provided with fins positioned within the audio module that guide the airflow generated during acoustical energy output. The fins can redirect at least some of the airflow through the audio module to decrease a peak velocity of air. Additionally, the fins can redistribute the airflow, thus providing a more uniform airflow distribution. Beneficially, the fins can reduce unwanted acoustical noise.

The fins described herein may take different shapes, such as a crescent shape or a rectangular shape, as non-limiting examples. Further, the fins described herein may include a variance in spacing, or separation, between both the walls of the audio module housing and/or between adjacent fins. Additionally, the angle of the fins within the audio module housing can vary in order to direct airflow in a desired manner (e.g., reduce peak airflow velocity).

Figure 1:
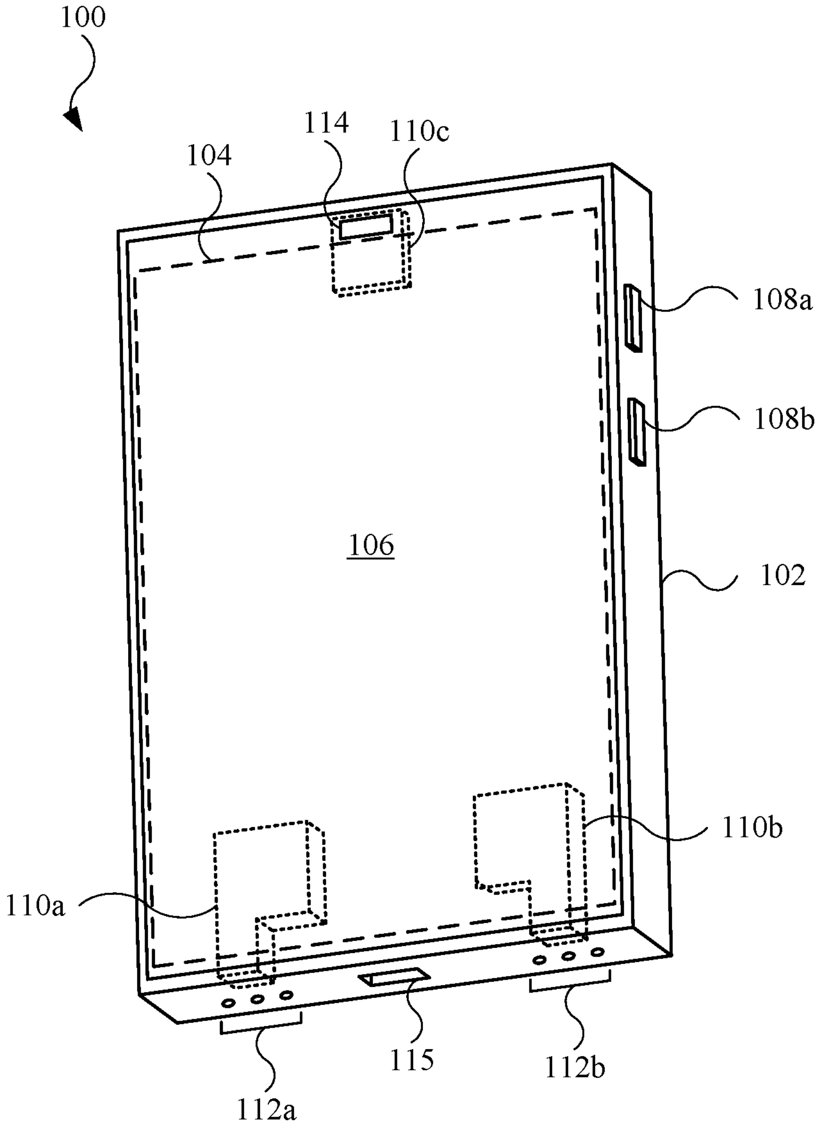
FIG. 1 illustrates an example electronic device that includes several audio modules in accordance with one or more implementations.

FIG. 1 illustrates a perspective view of an electronic device 100. As shown, the electronic device 100 includes a mobile wireless communication device, such as a smartphone or a tablet computing device. The electronic device 100 includes a housing 102 designed to carry various components, including processing circuitry (e.g., central processing unit, graphics processing unit), memory circuitry that stores executable programs (e.g., software), a battery that stores electrical energy, an image capturing device (e.g., camera), and a microphone, as non-limiting examples.

The electronic device 100 may include a display 104. The display 104 is designed to present visual information in the form of textual information, still images, and/or motion images (e.g., video). The display 104 may include a capacitive touch input display designed to receive touch inputs and/or gestures from a user. The display 104 may be covered by a transparent layer 106 that is coupled with the housing 102. The transparent layer 106 may include a material such as glass, plastic, or sapphire.

The electronic device 100 further includes additional input features, such as a button **108*a* and a button 108*b*. The buttons 108***a* and 108*b* can be actuated by a user to depress a switch to, for example, control what is presented on the display 104.

The electronic device 100 further includes several audio modules (e.g., speaker modules). As shown, the electronic device 100 includes an audio module 110*a*, an audio module 110*b*, and an audio module 110*c*. The audio modules 110*a*, 110*b*, and 110*c* are designed to provide acoustical energy output in the form of audible sound. Accordingly, the acoustical energy output provided by the audio modules 110*a*, 110*b*, and 110*c* may take the form of audio content, such as music and audio tracks corresponding to video content, as non-limiting examples. The amplitude (e.g., volume) of the audio modules 110*a*, 110*b*, and 110*c* can be adjusted by user inputs to the display 104 and/or to the buttons 108*a* and 108*b*. The housing 102 includes openings 112*a* and openings 112*b* that allow the acoustical energy generated by the audio modules 110*a* and 110*b*, respectively, to exit the electronic device 100. The transparent layer 106 includes an opening 114 that allows the acoustical energy generated by the audio module 110*c* to exit the electronic device 100.

Also, the electronic device 100 may include a port 115 designed to receive a connector (not shown in FIG. 1). Based on the port 115, the electronic device 100 may transmit or receive data, as well as receive electrical energy to charge a battery of the electronic device 100.

Figure 2:
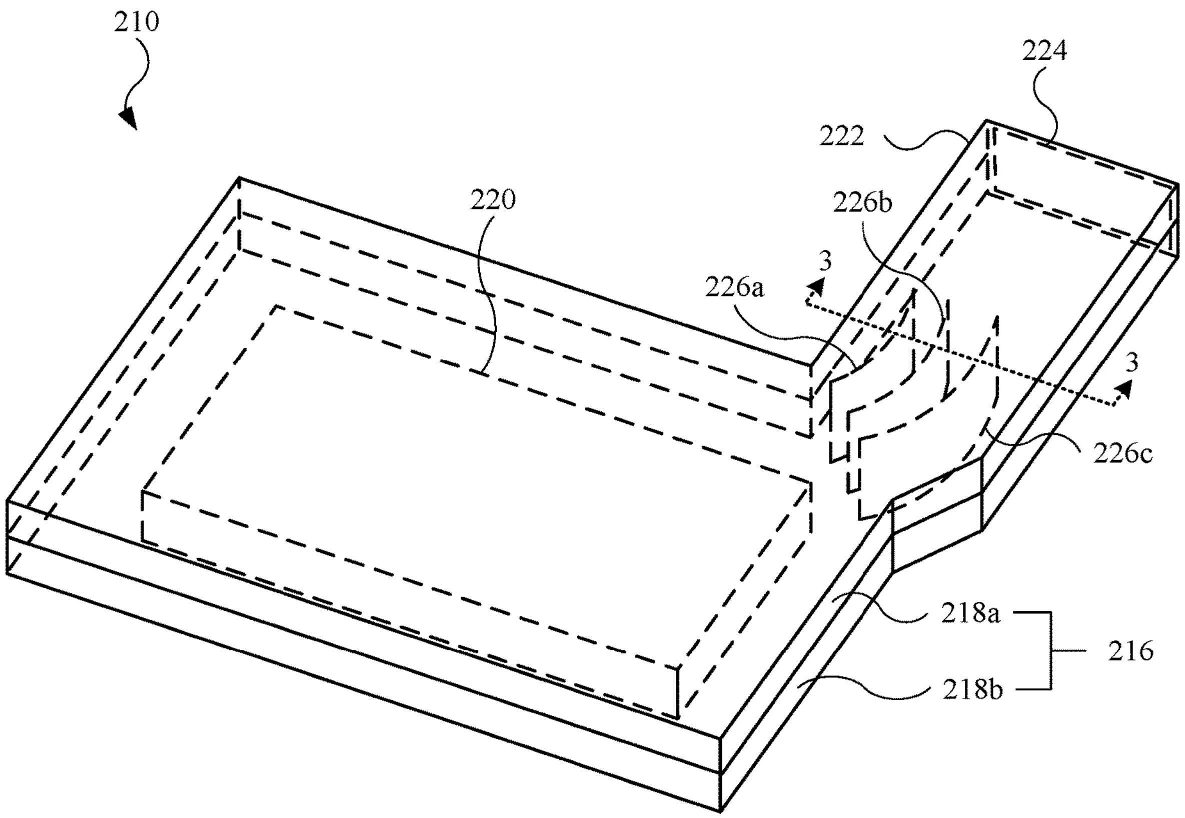
FIG. 2 illustrates a perspective view of an example audio module in accordance with various aspects of the subject technology.

FIG. 2 illustrates a perspective view of an audio module 210. The audio module 210 includes an enclosure 216 that defines an exterior of the audio module 210 and provides an internal volume that encloses several components for the audio module 210. The enclosure 216 includes a housing part 218*a* and a housing part 218*b*. The housing parts 218*a* and 218*b* may include a molded plastic, as a non-limiting example.

The enclosure 216 includes an internal volume portion for audio components 220 used to produce acoustical energy. The audio components 220 may include a voice coil, a membrane, a permanent magnet, and a yoke, as non-limiting examples. The enclosure 216 further includes an internal volume portion that forms a channel 222. The acoustical energy generated by the audio components 220 passes through the channel 222, and subsequently exits the audio module 210 through an outlet 224, or opening, of the enclosure 216 formed at the end of the channel 222.

Additionally, the audio module 210 includes several fins. For example, the audio module 210 includes a fin 226*a*, a fin 226*b*, and a fin 226*c* located in the enclosure 216, and primarily located in the channel 222. The fins 226*a*, 226*b*, and 226*c* may be formed during a molding operation of the housing part 218*a* or the housing part 218*b*. Accordingly, the fins 226*a*, 226*b*, and 226*c* may include the same or similar material make up as that of the housing parts 218*a* and 218*b*. Alternatively, the fins 226*a*, 226*b*, and 226*c* may include a different material, such as a metal (e.g., aluminum), to provide additional protection against breaking or collapsing of the channel 222. Moreover, when a metal is used, the thickness of the fins 226*a*, 226*b*, and 226*c* may vary (e.g., decrease) as the metal may provide more stiffness. When formed from a different material than that of the housing parts 218*a* and 218*b*, an over molding operation may be used to attach the fins 226*a*, 226*b*, and 226*c* to the housing parts 218*a* and 218*b*. Alternatively, the fins 226*a*, 226*b*, and 226*c* may be adhered to the housing parts 218*a* and 218*b*.

Based on their position in the enclosure 216, the fins 226*a*, 226*b*, and 226*c* are designed to direct airflow, resulting from the acoustical energy generated by the audio components

220, through the enclosure 216 such that the peak velocity of the airflow is reduced, and the airflow is more evenly distributed through the channel 222, as compared to an audio module without the fins 226*a*, 226*b*, and 226*c*. This will be further shown and described below.

Figure 3:
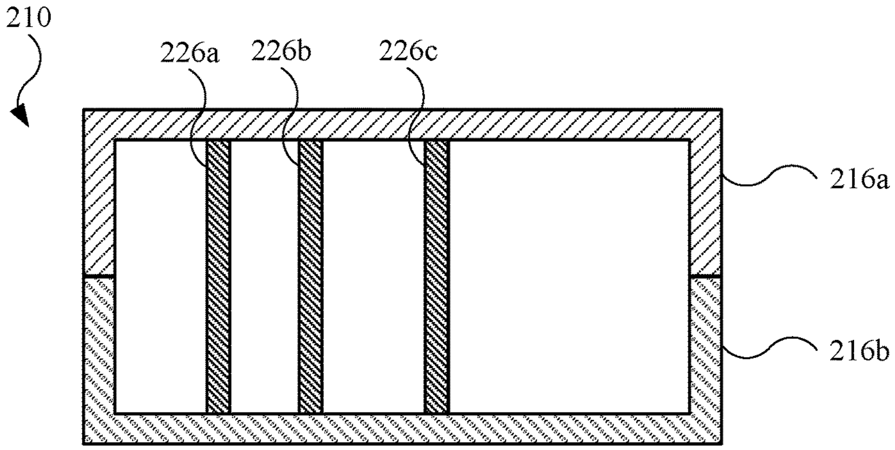
FIG. 3 illustrates a cross-sectional view of the audio module shown in FIG. 2, taken along line 3-3 in FIG. 2, in accordance with various aspects of the subject technology.

FIG. 3 illustrates a cross-sectional view of the audio module 210, taken along line 3-3 in FIG. 2. As shown, the fins 226*a*, 226*b*, and 226*c* extend to and engage each of the housing parts 218*a* and 218*b*. Alternatively, in some embodiments, the fins 226*a*, 226*b*, and 226*c* engage one of the housing parts 218*a* and 218*b*.

Figure 4:
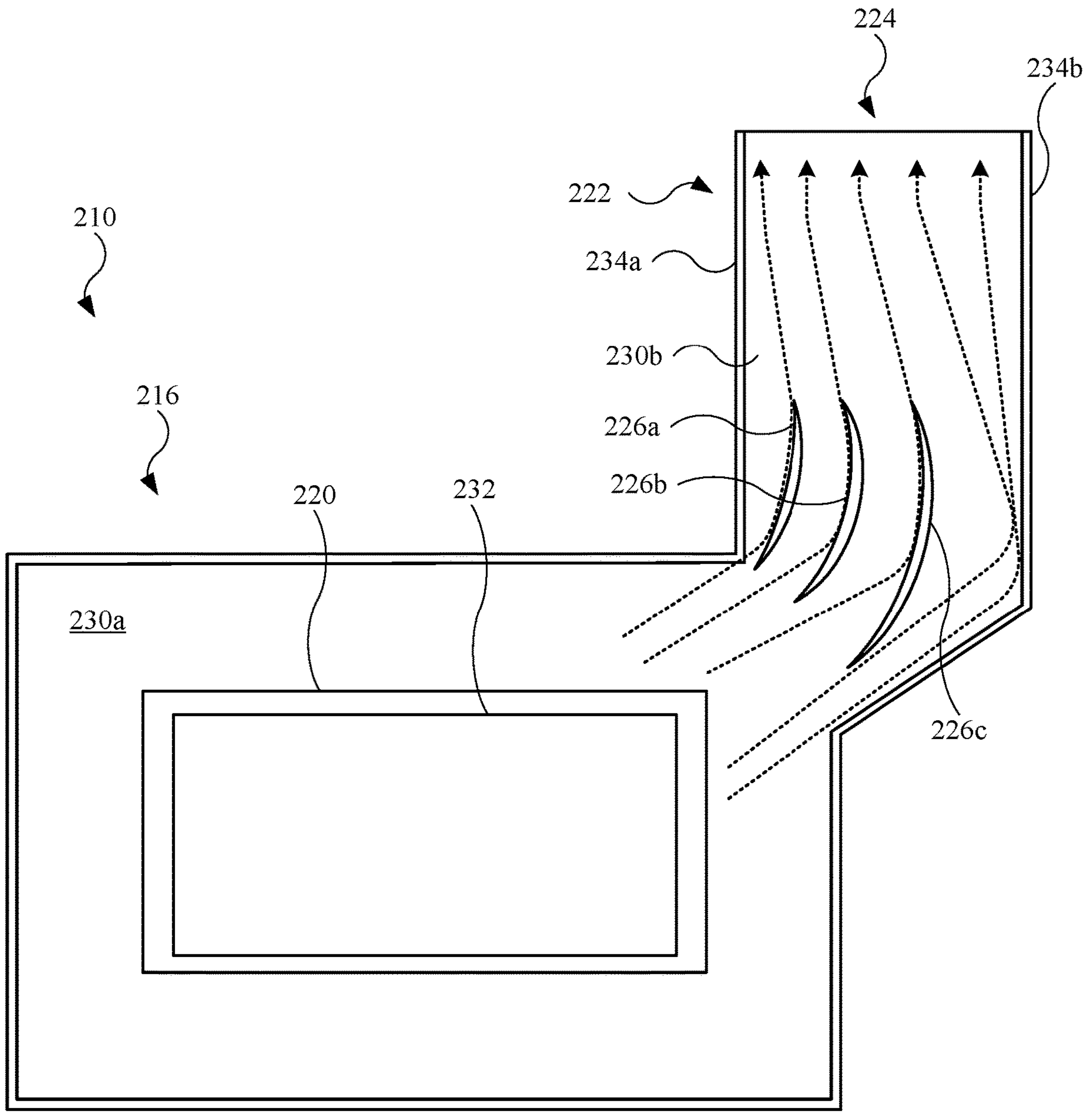
FIG. 4 illustrates an aerial view of an example audio module in accordance with one or more implementations.

FIG. 4 illustrates an aerial view of the audio module 210. For purposes of illustration, the housing part 218*a* is removed. As shown, the enclosure 216 includes a volume 230*a* that receives the audio components 220 and a volume 230*b* that defines the channel 222. The fins 226*a*, 226*b*, and 226*c* are generally positioned in the volume 230*b*, but may also be partially positioned in the volume 230*a*. During operation, a diaphragm 232 of the audio components 220 is driven (e.g., oscillated) to generate acoustical energy. This results in pressure fluctuations within the enclosure 216, which generates airflow. The airflow is represented by dotted lines in FIG. 4.

The channel 222 represents a diversion or departure for the airflow from the volume 230*a* to the volume 230*b*, causing the airflow to change direction. Put another way, the channel 222 represents a bend in the enclosure 216 that causes the airflow to change direction (including a 90-degree change of direction), which can cause an uneven airflow distribution through the channel 222. However, as shown in FIG. 4, the fins 226*a*, 226*b*, and 226*c* redirect the airflow through the channel 222 such that the airflow passing through the channel 222 includes a relatively uniform airflow distribution. For example, the channel 222 includes a wall 234*a* and 234*b*, with the walls 234*a* and 234*b* being parallel, or least substantially parallel. As shown in FIG. 4, some of the airflow reaches the wall 234*b*. However, the fins 226*a*, 226*b*, and 226*c* direct at least some of the airflow away from the wall 234*b* and generally in a direction toward the wall 234*a*. As a result, the airflow is more evenly distributed prior to exiting through the outlet 224. Moreover, the peak velocity of the airflow is reduced based upon the increased uniform airflow distribution. Beneficially, unwanted acoustical noise (i.e., audio content separate from the desired audio content generated by the audio components 220) is reduced based on a reduction of the peak velocity of the airflow.

Figure 5:
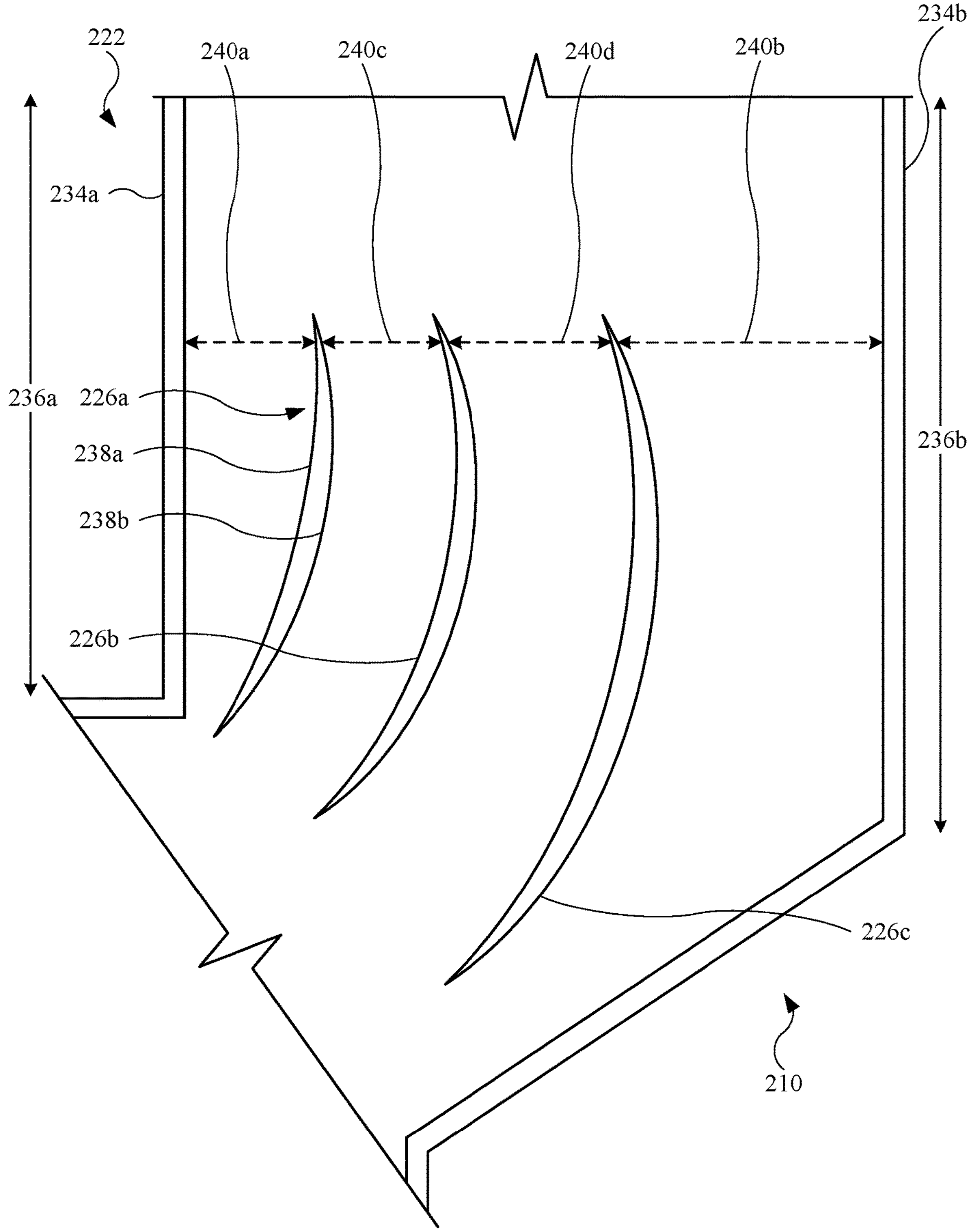
FIG. 5 illustrates an enlarged view of an example module, showing relationships among the fins in the audio module, in accordance with one or more implementations.

FIG. 5 illustrates an enlarged view of the audio module 210. Several dimensional features of the audio module 210 are shown. For example, the wall 234*a* includes a dimension 236*a*, or length, and the wall 234*a* includes a dimension 236*b*, or length. As shown, the dimension 236*b* is greater than the dimension 236*a*, thus providing the channel 222 with different characteristics.

Further, each of the fins 226*a*, 226*b*, and 226*c* include a crescent shape. In this regard, each of the fins 226*a*, 226*b*, and 226*c* is defined by one or more arcs. For example, the fin 226*a* (representative of the fins 226*b* and 226*c*) includes an arc 238*a* and an arc 238*b*. While the fins 226*a*, 226*b*, and 226*c* generally include the same shape, at least some differences may be present. For example, as shown in FIG. 5, the fin 226*b* includes a length that is greater than a length of the fin 226*a*, and the fin 226*c* includes a length that is greater than the length of the fin 226*b*. Put another way, the fin 226*c* is longer than the fin 226*b*, and the fin 226*b* is longer than the fin 226*a*. Accordingly, the fin 226*c* is longer than the fin 226*a*.

Also, several spatial differences among the fins 226*a*, 226*b*, and 226*c* may be present. For example, the fin 226*a* is separated from the wall 234*a* by a dimension 240*a*, or distance, and the fin 226*c* is separated from the wall 234*b* by a dimension 240*b*. As shown, the dimension 240*b* is greater than the dimension 240*a*. In this regard, the fins 226*a*, 226*b*, and 226*c* may be, collectively, offset from a center of the channel 222. As shown, the fins 226*a*, 226*b*, and 226*c* are, collectively, biased toward, or closer to, the wall 234*a* than the wall 234*b*. Further, the fin 226*a* is separated from the fin 226*b* by a dimension 240*c*, and the fin 226*b* is separated from the fin 226*c* by a dimension 240*d*. As shown, the dimension 240*d* is greater than the dimension 240*c*. Further, as shown, the dimension 240*b* is greater than the dimension 240*d*.

Although not shown, other spatial relationships may be present. For example, in some embodiments, the fins 226*a*, 226*b*, and 226*c* are centered within the channel 222, i.e., separated equally from the wall 234*a* and the wall 234*b*. Further, in some embodiments, the fins 226*a*, 226*b*, and 226*c* are separated equally from each other. Also, based on their respective shapes, the fins 226*a*, 226*b*, and 226*c* are non-parallel, or at least include a substantially non-parallel portion, with respect to the walls 234*a* and 234*b*.

FIGS. 6-10 show and describe fins with different characteristics. It should be noted that the fins shown and described in FIGS. 6-10 may include several features similar to those shown and described for the fins 226*a*, 226*c*, and 226*c* in FIGS. 2-5.

Figure 6:
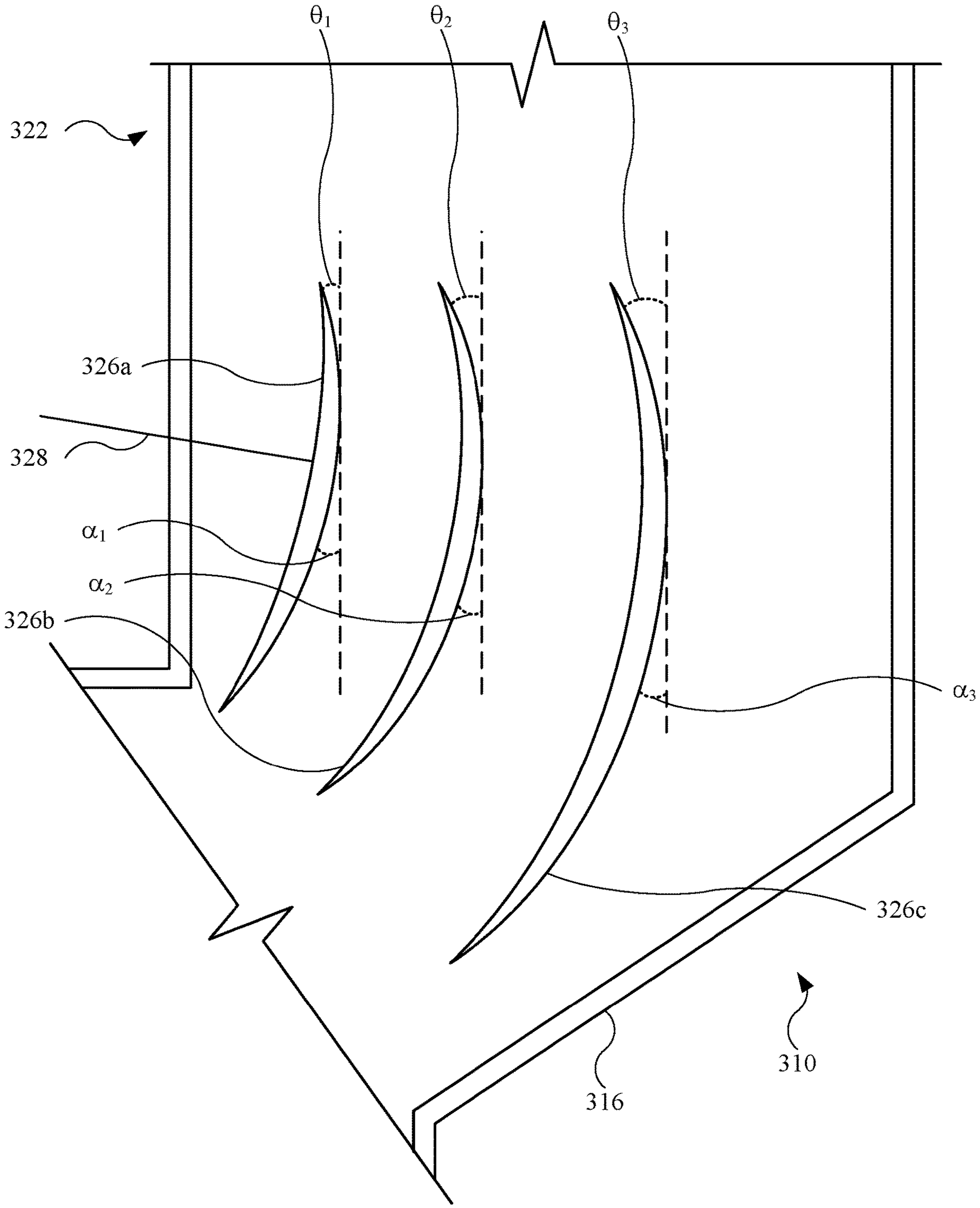
FIG. 6 illustrates an enlarged view of an example audio module, showing additional relationships among the fins in the audio module, in accordance with one or more implementations.

FIG. 6 illustrates an aerial view of an audio module 310. The audio module 310 includes an enclosure 316 that forms a channel 322. For purposes of illustration, a housing part of the enclosure 316 is removed. As shown, the audio module 310 includes a fin 326*a*, a fin 326*b*, and a fin 326*c*, each having a crescent shape. However, the individual shapes of the fins 326*a*, 326*b*, and 326*c* may differ. For example, the fin 326*a* includes an angle $\alpha_1$ and an angle $\theta_1$, with the angles $\alpha_1$ and $\theta_1$ being relative to an imaginary straight line (shown as a dotted line). Further, the fin 326*b* includes an angle $\alpha_2$ and an angle $\theta_2$, with the angles $\alpha_2$ and $\theta_2$ being relative to an imaginary straight line (shown as a dotted line). Also, the fin 326*c* includes an angle $\alpha_3$ and an angle $\theta_3$, with the angles $\alpha_3$ and $\theta_3$ being relative to an imaginary straight line (shown as a dotted line). Each of the angles $\alpha_1$, $\alpha_2$, and $\alpha_3$ are approximately in the range of 10 to 40 degrees. In some embodiments, each of the angles $\alpha_1$, $\alpha_2$, and $\alpha_3$ are different from each other. In some embodiments, one of the angles $\alpha_1$, $\alpha_2$, and $\alpha_3$ is different from the remaining, while the remaining angles are the same. In some embodiments, each of the angles $\alpha_1$, $\alpha_2$, and $\alpha_3$ are the same.

Similarly, each of the angles $\theta_1$, $\theta_2$, and $\theta_3$ may be approximately in the range of 10 to 40 degrees. In some embodiments, each of the angles $\theta_1$, $\theta_2$, and $\theta_3$ are different from each other. In some embodiments, one of the angles $\theta_1$, $\theta_2$, and $\theta_3$ is different from the remaining, while the remaining angles are the same. In some embodiments, each of the angles $\theta_1$, $\theta_2$, and $\theta_3$ are the same. The respective angles for the fins 326*a*, 326*b*, and 326*c* can be selected to divert airflow in a manner that minimizes acoustic noise profile (i.e., minimum unwanted noise) for the audio module 310. Accordingly, the respective angles may be selected to reduce peak velocity of the airflow, as well as enhance/increase airflow distribution within the channel 322.

Based on the angles (e.g., $\alpha$ and $\theta$) for the fins 326*a*, 326*b*, and 326*c*, the curvature for the fins 326*a*, 326*b*, and 326*c* may be the same or different. For example, the fin 326*a* includes a radius of curvature 328 (representative of a radius of curvature for the fins 326*b* and 326*c*) that is based upon the angles $\alpha_1$ and $\theta_1$. When either of the angles $\alpha_2$ and $\theta_2$ differ from that of the angles $\alpha_1$ and $\theta_1$, respectively, the radius of curvature 328 of the fin 326*a* is different from that of the fin 326*b*. Similarly, when either of the angles $\alpha_3$ and $\theta_3$ differ from that of the angles $\alpha_1$ and $\theta_1$, respectively, the radius of curvature 328 of the fin 326*a* is different from that of the fin 326*c*. Conversely, when the angles $\alpha_1$, $\alpha_2$, and $\alpha_3$ are the same, and when the angles $\theta_1$, $\theta_2$, and $\theta_3$ are the same, then the radius of curvature for the fins 326*a*, 326*b*, and 326*c* are the same.

Figure 7:
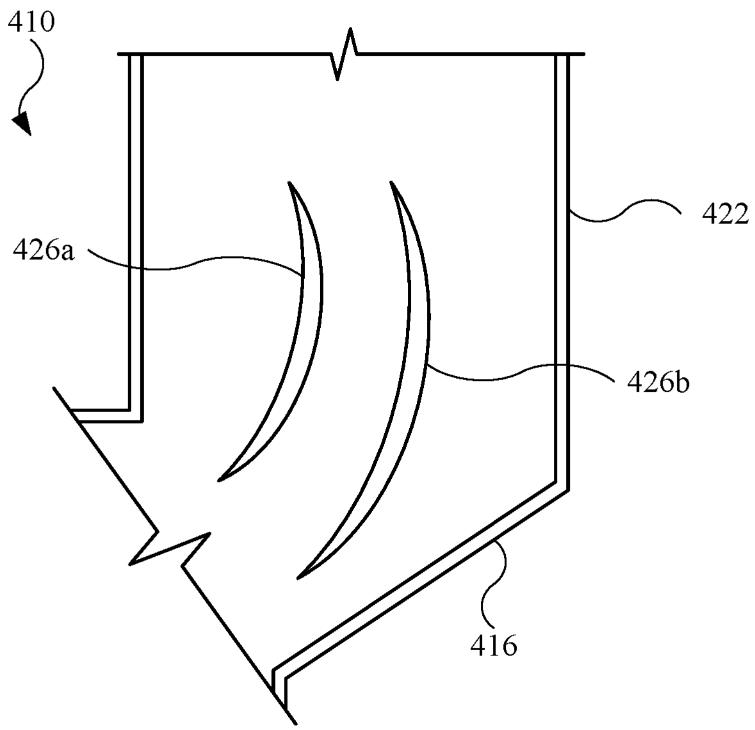
FIGS. 7 and 8 illustrate aerial views of example audio modules with a different number of fins in accordance with various aspects of the subject technology.
Figure 8:
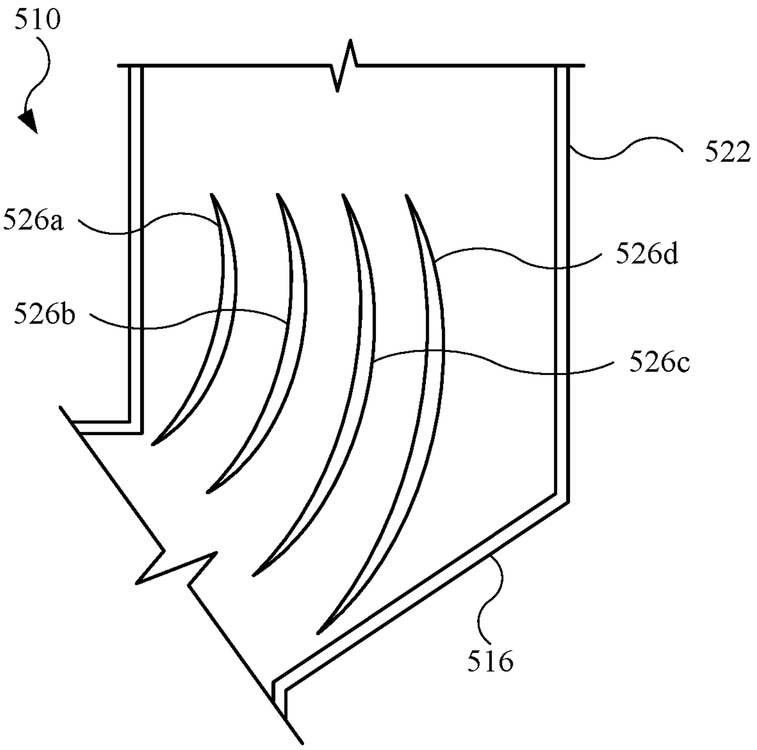

The number of fins may vary in some audio modules. For example, FIG. 7 illustrates an audio module 410 with an enclosure 416 that forms a channel 422. The audio module 410 includes a fin 426*a* and a fin 426*b* located within the channel 422. In another example, FIG. 8 illustrates an audio module 510 with an enclosure 516 that forms a channel 522. The audio module 510 includes a fin 526*a*, a fin 526*b*, a fin 526*c* and a fin 526*d* located within the channel 522. Accordingly, the number of fins is not limited to a discrete number and may vary in different audio modules based on factors such as available space and desired acoustic noise minimization.

Figure 9:
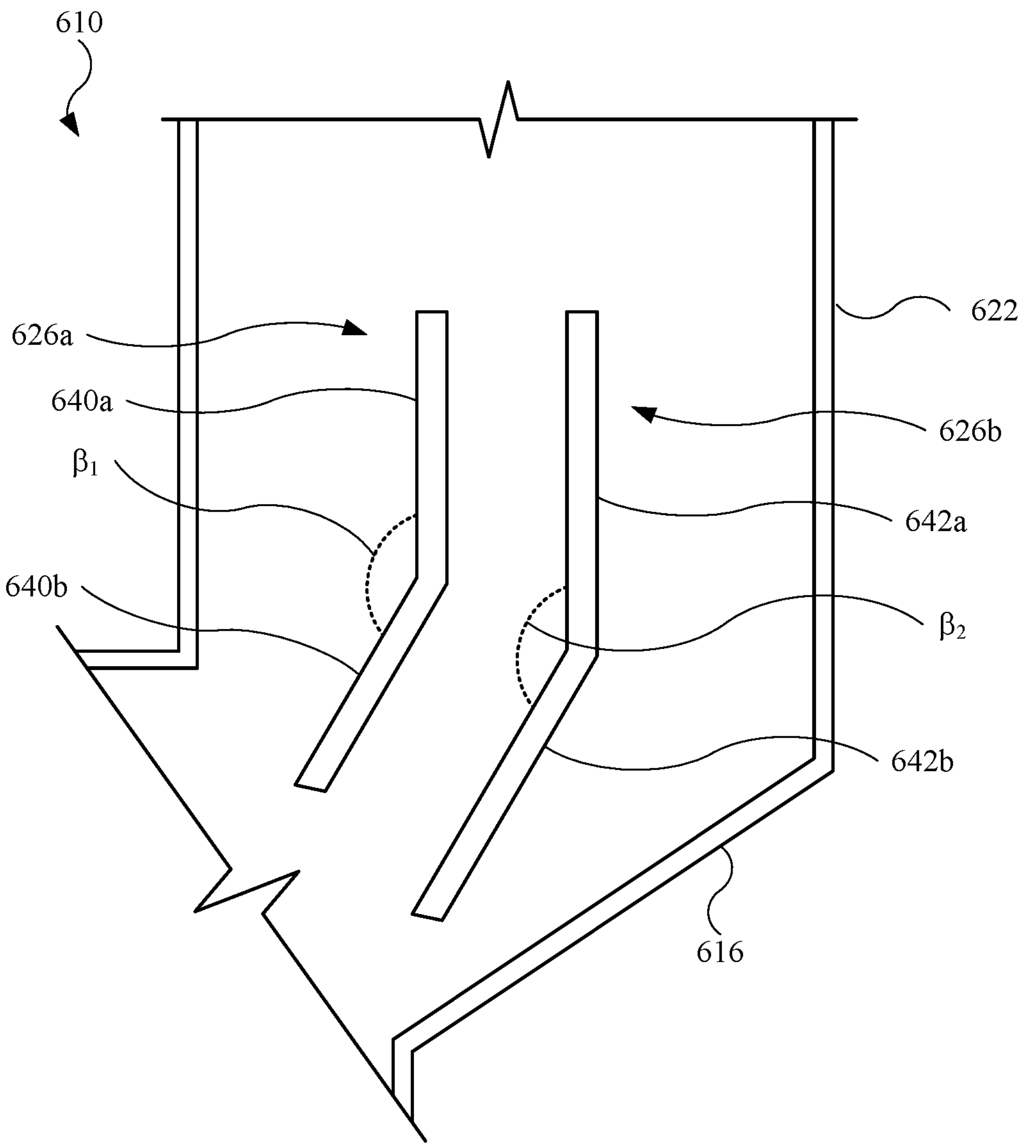
FIG. 9 illustrates an aerial view of an example audio module with fins having a different shape in accordance with various aspects of the subject technology.

FIG. 9 illustrates an aerial view of an audio module 610 that includes an enclosure 616 with a channel 622. The audio module 610 includes a fin 626*a* and a fin 626*b* located within the channel 622. Each of the fins 626*a* and 626*b* may include rectangular sections connected together. For example, the fin 626*a* includes a rectangular portion 640*a* and a rectangular portion 640*b* connected to the rectangular portion 640*a*. Similarly, the fin 626*b* includes a rectangular portion 642*a* and a rectangular portion 642*b* connected to the rectangular portion 642*a*. However, as shown in FIG. 9, the rectangular portions 642*a* and 642*b* include at least one dimension greater than that of the rectangular portions 640*a* and 640*b*, respectively. Accordingly, the fin 626*b* is longer than the fin 626*a*.

Further, the rectangular portions 640*a* and 640*b* are separated by an angle $\beta_1$, and the rectangular portions 642*a* and 642*b* are separated by an angle $\beta_2$. Each of the angles $\beta_1$ and $\beta_2$ includes an obtuse angle. Moreover, the angles $\beta_1$ and $\beta_2$ may each include an angle approximately in the range of 100 to 150 degrees. As shown in FIG. 9, the angles $\beta_1$ and $\beta_2$ are the same, and the general shape of the fins 626*a* and 626*b* is similar. However, in some embodiments, the angles $\beta_1$ and $\beta_2$ are different, and as a result, the shape of the fins 626*a* differs from that of the fin 626*b*.

Figure 10:
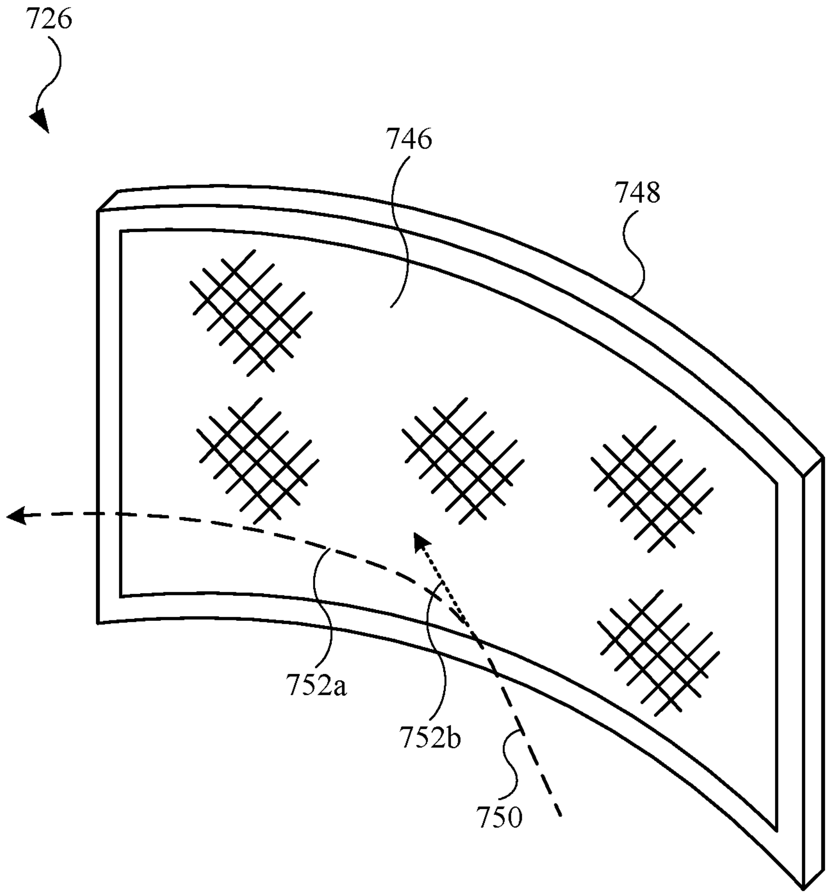
FIG. 10 illustrates a perspective view of an example fin with a mesh material in accordance with various aspects of the subject technology.

FIG. 10 illustrates a perspective view of a fin 726 with an air-permeable material 746. In some embodiments, the air-permeable material 746 includes a mesh material. The fin 726 further includes a border 748 that surrounds the air-permeable material 746.

When integrated into an audio module, the fin 726 may allow at least some airflow to pass through the air-permeable material 746. For example, airflow 750 (represented by dotted lines) includes a portion 752*a* that is deflected by the air-permeable material 746, and a portion 752*b* that passes through the air-permeable material 746. Accordingly, the fin 726 can permit some of the airflow 750 to pass through when, for example, the force/pressure of the airflow 750 is relatively high. Beneficially, the fin 726 may further promote an even airflow distribution through a channel of an audio module. It should be noted that one or more fins described herein may be modified to include an air-permeable material similar to that of the air-permeable material 746.

Figure 11:
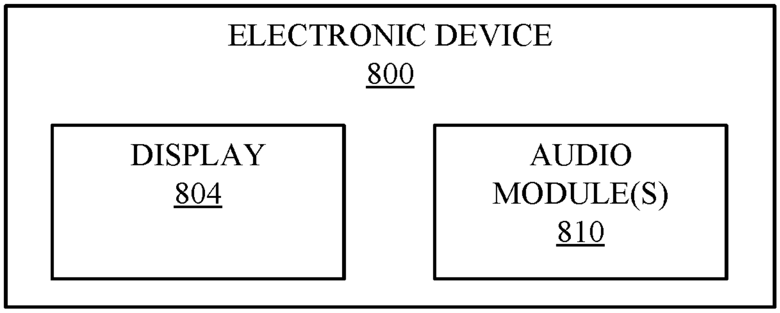
FIG. 11 illustrates a block diagram of an example electronic device that can include one or more audio modules in accordance with various aspects of the subject technology.

In addition to smartphones and tablet computing devices, audio modules described herein may be integrated into other devices. For example, FIG. 11 illustrates a block diagram of an electronic device 800 that represents additional, non-limiting devices, each of which including one or audio modules 810. The one or more audio modules 810 may include features similar to those shown and descried herein for an audio module, such as one or more fins for airflow and peak velocity control, as non-limiting examples. The electronic device 800 can take the form of a desktop computing device. Alternatively, the electronic device 800 may take the form of wireless headphones or wireless earbuds, each of which including at least two audio modules. Optionally, the electronic device 800 may include a display 804, and accordingly, the electronic device 800 can take the form of a standalone display, a computing device with a display, or a laptop computing device.

Figure 12:
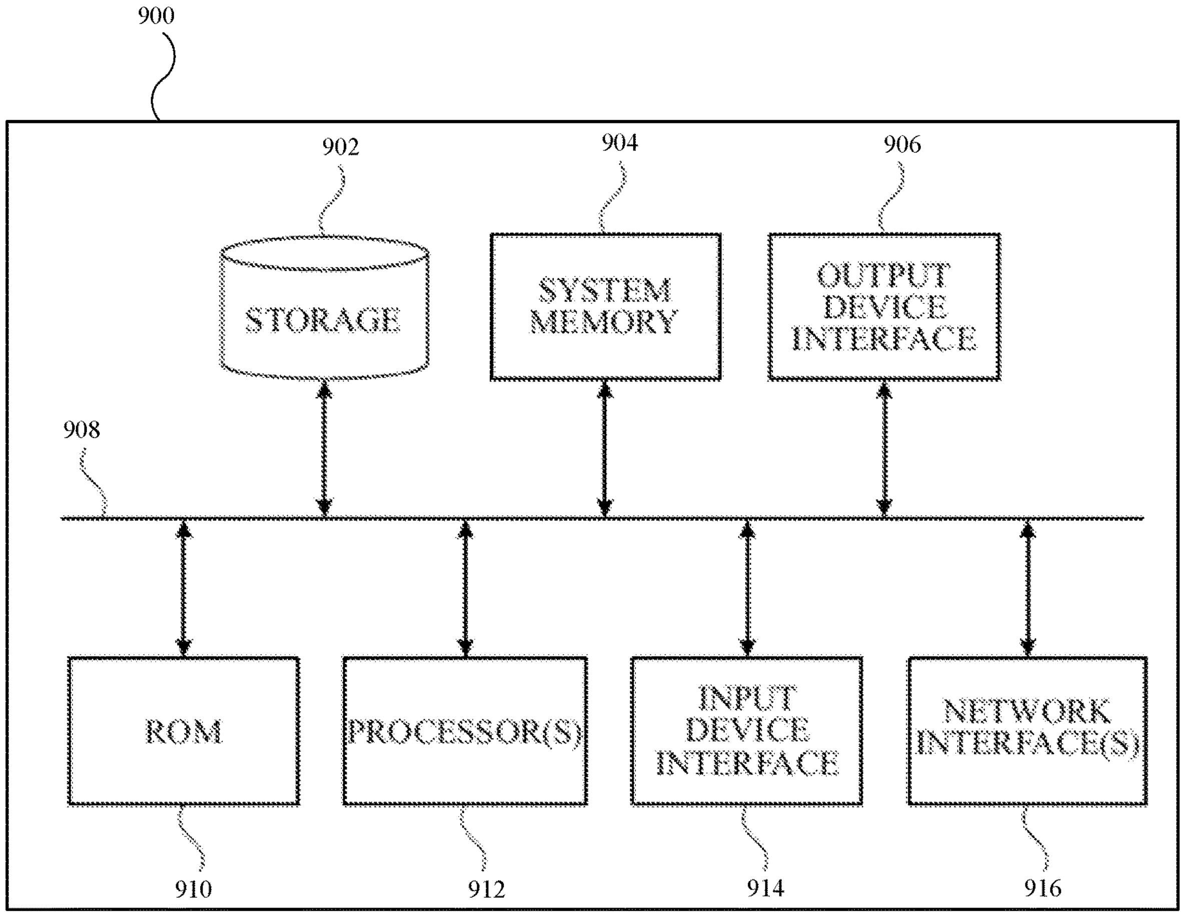
FIG. 12 illustrates an electronic system with which one or more implementations of the subject technology may be implemented.

FIG. 12 illustrates an electronic system 900 with which one or more implementations of the subject technology may be implemented. The electronic system 900 can be the electronic device 100, as shown in FIG. 1. The electronic system 900 may include various types of computer readable media and interfaces for various other types of computer readable media. The electronic system 900 includes a bus 908 that places in communication a permanent storage device 902, a system memory 904 (and/or buffer), an output device interface 906, a read-only memory (ROM) 910, one or more processing unit(s) 912, an input device interface 914, and one or more network interfaces 916, or subsets and variations thereof The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910 (which are each implemented as a non-transitory computer-readable medium). From these various memory units, the one or more processing unit(s) 912 retrieves instructions to execute and data to process in order to execute the processes of one or more implementations.

The bus 908 also connects to the input device interface 914 and the output device interface 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 908 also couples the electronic system 900 to one or more networks and/or to one or more network nodes, such as the electronic device 100 shown in FIG. 1, through the one or more network interfaces 916. In this manner, the electronic system 900 can be a part of a network of computers (such as a LAN, a wide area network ("WAN")), or an Intranet, or a network of networks, such as the Internet. Any or all components of the electronic system 900 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In one or more implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the disclosure, an audio module is provided that includes an enclosure with a first volume that stores at least one audio component. The enclosure further includes a second volume defining a channel that forms an acoustic path for the at least one audio component. The audio module further includes fins at least partially disposed in the channel. The fins include a first fin having a first length. The fins further include a second fin having a second length greater than the first length.

In accordance with aspects of the disclosure, an audio module is provided that includes an enclosure that that includes a channel. The audio module further includes audio components located in the enclosure. The audio components are configured to generate acoustical energy resulting in airflow. The audio module further includes fins at least partially positioned in the channel. The fins are configured to redistribute the airflow through the channel.

In accordance with aspects of the disclosure, an electronic device is provided that includes a display configured to present visual information. The electronic device further includes a housing coupled with the display. The electronic device further includes an acoustic module carried by the housing. The audio module includes an enclosure that defines an internal volume. The enclosure includes a first housing part. The enclosure further includes a second housing part. The first housing part and the second housing part form a channel. The audio module further includes audio components disposed in the internal volume. The audio components include a diaphragm. The audio components further include a voice coil configured to acoustically drive the diaphragm to generate acoustical energy, thereby generating airflow. The audio module further includes fins configured to redistribute the airflow through the channel. The fins includes a first fin, a second fin, and a third fin. Each of the first fin, the second fin, and the third fin engage the first housing part and the second housing part.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An audio module, comprising:
an enclosure that includes:
a first volume that stores at least one audio component, and
a second volume defining a channel that forms an acoustic path for the at least one audio component; and
a plurality of fins at least partially disposed in the channel, the plurality of fins comprising:
a first fin having a first length, and
a second fin having a second length greater than the first length.

2. The audio module of claim 1, wherein:
the enclosure comprises a first housing part and a second housing part coupled with the first housing part, and
the plurality of fins extend from the first housing part to the second housing part.

3. The audio module of claim 1, wherein:
the first fin forms a first arc, and
the second fin forms a second arc.

4. The audio module of claim 3, wherein:
the plurality of fins further comprise a third fin having a third length greater than the second length, and
the third fin forms a third arc.

5. The audio module of claim 3, wherein:
the first arc comprises a first radius of curvature, and
the second arc comprises a second radius of curvature different from the first radius of curvature.

6. The audio module of claim 5, wherein:
the channel comprises a first wall and a second wall opposite the first wall, and
the first arc and the second arc are non-parallel with respect to the first wall and the second wall based on the first radius of curvature and the second radius of curvature, respectively.

7. The audio module of claim 1, wherein the first fin comprises:
a first portion; and
a second portion at an angle with respect to the first portion, wherein the angle is at least 90 degrees.

8. The audio module of claim 7, wherein:
the channel comprises a first wall and a second wall opposite the first wall, and
the first portion is parallel with respect to the first wall and the second wall.

9. An audio module, comprising:
an enclosure that comprising a channel;
audio components located in the enclosure, the audio components configured to generate acoustical energy resulting in airflow; and
a plurality of fins at least partially positioned in the channel, the plurality of fins configured to redistribute the airflow through the channel.

10. The audio module of claim 9, wherein the channel comprises:
a first wall having a first length, and
a second wall having a second length greater than the first length.

11. The audio module of claim 10, wherein the plurality of fins are configured to redistribute the airflow toward the first wall.

12. The audio module of claim 9, wherein the plurality of fins comprise:
a first fin;
a second fin separated from the first fin by a first distance; and
a third fin separated from the second fin by a second distance different from the first distance.

13. The audio module of claim 12, wherein the first distance is less than the second distance.

14. The audio module of claim 12, wherein:
the first fin includes a first length,
the second fin includes a second length greater than the first length, and
the third fin includes a third length greater than the second length.

15. The audio module of claim 14, wherein:
the first fin forms a first arc,
the second fin forms a second arc, and
the third fin forms a third arc.

16. The audio module of claim 12, wherein one or more of the first fin, the second fin, and the third fin comprise an air-permeable material.

17. The audio module of claim 9, wherein the plurality of fins are offset with respect to a center of the channel.

18. An electronic device, comprising:
a display configured to present visual information;
a housing coupled with the display; and
an audio module carried by the housing, the audio module comprising:
an enclosure that defines an internal volume, the enclosure comprising:
a first housing part, and
a second housing part, wherein the first housing part and the second housing part form a channel;
audio components disposed in the internal volume, the audio components comprising:
a diaphragm, and
a voice coil configured to acoustically drive the diaphragm to generate acoustical energy, thereby generating airflow; and
a plurality of fins configured to redistribute the airflow through the channel, the plurality of fins comprising:
a first fin,
a second fin, and
a third fin, wherein each of the first fin, the second fin, and the third fin engage the first housing part and the second housing part.

19. The electronic device of claim 18, wherein:
the second fin is longer than the first fin, and
the third fin is longer than the second fin.

20. The electronic device of claim 18, wherein:
the channel comprises an outlet, and
the plurality of fins are configured to cause a uniform distribution of the airflow through the outlet.

* * * * *